United States Patent
Cui et al.

(10) Patent No.: US 11,243,707 B2
(45) Date of Patent: Feb. 8, 2022

(54) METHOD AND SYSTEM FOR IMPLEMENTING VIRTUAL MACHINE IMAGES

(71) Applicant: Nutanix, Inc., San Jose, CA (US)

(72) Inventors: Miao Cui, Sunnyvale, CA (US); Gregory Andrew Smith, Oakland, CA (US); Tabrez Memon, Santa Clara, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 14/206,924

(22) Filed: Mar. 12, 2014

(65) Prior Publication Data

US 2016/0202916 A1 Jul. 14, 2016

(51) Int. Cl.
*G06F 3/06* (2006.01)
*G06F 9/455* (2018.01)
*G06F 8/61* (2018.01)

(52) U.S. Cl.
CPC ............ *G06F 3/065* (2013.01); *G06F 3/0604* (2013.01); *G06F 3/0664* (2013.01); *G06F 3/0683* (2013.01); *G06F 8/63* (2013.01); *G06F 9/45533* (2013.01); *G06F 9/45558* (2013.01); *G06F 2009/45562* (2013.01); *G06F 2009/45575* (2013.01)

(58) Field of Classification Search
CPC ...... G06F 3/065; G06F 3/0604; G06F 3/0644; G06F 9/45533; G06F 3/0683
See application file for complete search history.

(56) References Cited

U.S. PATENT DOCUMENTS

| | | | |
|---|---|---|---|
| 7,979,395 B1 | 7/2011 | Aggarwal et al. | |
| 8,046,550 B2 | 10/2011 | Feathergill | |
| 8,135,930 B1 | 3/2012 | Mattox et al. | |
| 8,151,263 B1 * | 4/2012 | Venkitachalam | G06F 9/485 711/162 |
| 8,166,265 B1 | 4/2012 | Feathergill | |
| 8,234,469 B2 | 7/2012 | Ranade | |
| 8,335,902 B1 | 12/2012 | Feathergill | |
| 8,364,858 B1 | 1/2013 | Martin et al. | |
| 8,549,518 B1 | 10/2013 | Aron et al. | |
| 8,601,473 B1 | 12/2013 | Aron et al. | |
| 8,656,386 B1 | 2/2014 | Baimetov | |
| 8,756,598 B1 * | 6/2014 | Costea | G06F 9/45558 717/174 |
| 8,762,967 B2 | 6/2014 | Kim | |

(Continued)

OTHER PUBLICATIONS

PCT International Search Report and Written Opinion for International Appln. No. PCT/US2015/020144, Applicant Nutanix, Inc., Forms PCT/ISA/210, 220, and 237, dated Jun. 22, 2015 (8 pages).

(Continued)

*Primary Examiner* — Jason W Blust
*Assistant Examiner* — Eric T Loonan
(74) *Attorney, Agent, or Firm* — Vista IP Law Group, LLP

(57) ABSTRACT

Disclosed is an improved approach to implement virtualization objects in a virtualization system. The virtualization object from a first namespace is cloned as a snapshot that is accessible within a second namespace. To implement this, the virtualization object can be mounted as a target (implemented as a snapshot) that is locally accessible to the host.

27 Claims, 13 Drawing Sheets

(56) References Cited

U.S. PATENT DOCUMENTS

| | | |
|---|---|---|
| 8,850,130 B1 | 9/2014 | Aron et al. |
| 8,914,595 B1 | 12/2014 | Natanzon |
| 9,009,106 B1 | 4/2015 | Aron et al. |
| 9,043,567 B1 | 5/2015 | Modukuri et al. |
| 9,069,708 B2 | 6/2015 | Gill et al. |
| 9,135,127 B1 | 9/2015 | Havemose |
| 9,348,634 B2 | 5/2016 | Allen |
| 9,377,964 B2 | 6/2016 | Sharma et al. |
| 9,396,200 B2 | 7/2016 | Jacoby et al. |
| 9,430,333 B2 | 8/2016 | D'amato et al. |
| 9,501,233 B2 | 11/2016 | Harris et al. |
| 9,547,562 B1 * | 1/2017 | Feathergill .......... G06F 11/1458 |
| 9,588,870 B2 | 3/2017 | Marron et al. |
| 9,772,866 B1 | 9/2017 | Aron et al. |
| 9,823,973 B1 | 11/2017 | Natanzon |
| 9,886,215 B1 | 2/2018 | Ramachandran et al. |
| 9,984,004 B1 | 5/2018 | Little et al. |
| 10,038,731 B2 | 7/2018 | Pearl et al. |
| 10,061,656 B2 | 8/2018 | Zou |
| 10,423,609 B1 | 9/2019 | Strauss |
| 2004/0143832 A1 | 7/2004 | Yamamoto et al. |
| 2005/0055603 A1 | 3/2005 | Soran et al. |
| 2006/0101189 A1 | 5/2006 | Chandrasekaran et al. |
| 2007/0074208 A1 | 3/2007 | Ling |
| 2007/0079298 A1 | 4/2007 | Tian |
| 2007/0174915 A1 | 7/2007 | Gribble et al. |
| 2007/0244938 A1 | 10/2007 | Micheal et al. |
| 2008/0052331 A1 | 2/2008 | Ogawa et al. |
| 2008/0065854 A1 | 3/2008 | Schoenberg et al. |
| 2008/0115143 A1 | 5/2008 | Shimizu et al. |
| 2008/0244028 A1 | 10/2008 | Le |
| 2009/0125678 A1 | 5/2009 | Tokuda et al. |
| 2009/0260007 A1 | 10/2009 | Beaty et al. |
| 2010/0011178 A1 | 1/2010 | Feathergill |
| 2010/0077142 A1 | 3/2010 | Fienblit et al. |
| 2010/0077165 A1 | 3/2010 | Lu et al. |
| 2010/0162242 A1 * | 6/2010 | Grouzdev ........... G06F 9/45558 718/1 |
| 2010/0287407 A1 | 11/2010 | Basu et al. |
| 2010/0299309 A1 | 11/2010 | Maki et al. |
| 2010/0319004 A1 | 12/2010 | Hudson et al. |
| 2011/0047340 A1 | 2/2011 | Olson et al. |
| 2011/0107052 A1 | 5/2011 | Narayanasamy |
| 2011/0154378 A1 | 6/2011 | Kishan et al. |
| 2011/0219201 A1 | 9/2011 | Ranade |
| 2011/0302226 A1 | 12/2011 | Abadi et al. |
| 2011/0307531 A1 * | 12/2011 | Gaponenko ............... G06F 8/63 707/822 |
| 2012/0005668 A1 | 1/2012 | Serizawa |
| 2012/0117299 A1 | 5/2012 | Waldspurger |
| 2012/0144391 A1 | 6/2012 | Ueda |
| 2012/0167082 A1 | 6/2012 | Kumar |
| 2012/0188592 A1 | 7/2012 | Handley |
| 2012/0278799 A1 | 11/2012 | Starks et al. |
| 2012/0331462 A1 | 12/2012 | Falko |
| 2013/0179574 A1 | 7/2013 | Calder et al. |
| 2013/0198489 A1 | 8/2013 | Branson et al. |
| 2013/0227558 A1 | 8/2013 | Du |
| 2014/0195753 A1 | 7/2014 | Khatri et al. |
| 2014/0229949 A1 | 8/2014 | Cai |
| 2014/0282824 A1 | 9/2014 | Lango et al. |
| 2014/0317265 A1 | 10/2014 | James et al. |
| 2014/0325170 A1 | 10/2014 | Aswathanarayana et al. |
| 2014/0359043 A1 | 12/2014 | Gao et al. |
| 2014/0365740 A1 | 12/2014 | Vasilyev et al. |
| 2015/0180714 A1 | 6/2015 | Chunn |
| 2015/0188775 A1 | 7/2015 | Van Der Walt |
| 2015/0248402 A1 | 9/2015 | Patterson, III |
| 2015/0317177 A1 | 11/2015 | Hussain et al. |
| 2016/0004451 A1 | 1/2016 | Lakshman et al. |
| 2016/0054774 A1 | 2/2016 | Song et al. |
| 2016/0124764 A1 | 5/2016 | Nithrakashyap et al. |
| 2016/0124972 A1 | 5/2016 | Jain et al. |
| 2016/0203013 A1 | 7/2016 | Bayapuneni et al. |
| 2016/0292074 A1 | 10/2016 | Awasthi et al. |
| 2020/0042402 A1 | 2/2020 | Padia et al. |
| 2020/0134479 A1 | 4/2020 | Parthasarathy et al. |

OTHER PUBLICATIONS

Final Office Action dated Jul. 12, 2018 for related U.S. Appl. No. 15/178,504.

U.S. Appl. No. 15/160,347, filed May 20, 2016, 62 pages.

Non-final Office Action dated Jun. 4, 2015 for related U.S. Appl. No. 13/926,921.

Final Office Action dated Dec. 22, 2015 for related U.S. Appl. No. 13/926,921.

International Search Report and Written Opinion dated May 30, 2014 for related PCT Patent Application No. PCT/US13/78389.

Non-final Office Action dated Mar. 12, 2015 for related U.S. Appl. No. 13/918,660.

Final Office Action dated Aug. 31, 2015 for related U.S. Appl. No. 13/918,660.

Non-final Office Action dated Jan. 6, 2016 for related U.S. Appl. No. 13/928,097.

Final Office Action dated May 10, 2016 for related U.S. Appl. No. 13/928,097.

Non-final Office Action dated Jun. 3, 2016 for related U.S. Appl. No. 14/278,429.

Non-final Office Action dated Jun. 7, 2016 for related U.S. Appl. No. 13/918,660.

Non-final Office Action dated Aug. 11, 2016 for related U.S. Appl. No. 13/926,921.

Final Office Action dated Oct. 3, 2016 for related U.S. Appl. No. 13/918,660.

Xiv Storage Reinvented, Snapshots Reinvented IBM XIV Storage System, Copyright IBM Corporation 2008, 17 pages, Sep. 2008.

Navarro, et al., "FuSnap: Fuzzy Control of Logical Volume Snapshot Replication for Disk Arrays", Copyright 2010, 9 pages, Jun. 2010.

Sankaran et al., "Volume Shadow Copy Service", Storage Environment, Power Solutions, Mar. 2004, 4 pages.

Overland Storage, "Hardware Provider for Microsoft Volume Shadow Copy Service (VSS) User Guide", Ultamus Raid, Copyright 2008, 20 pages, Jan. 2008.

Fujitsu Limited, "VSS Backup Solution for Exchange Server 2007 and Symantec Backup Exec 12.5 using ETERNUS VSS Hardware Provider" System Configuration Guide, Copyright 2009, 45 pages, Nov. 2009.

Final Office Action dated Nov. 30, 2016 for related U.S. Appl. No. 14/278,429.

Notice of Allowance and Fee(s) due dated Jan. 25, 2017 for related U.S. Appl. No. 13/918,660.

Final Office Action dated Mar. 2, 2017 for related U.S. Appl. No. 13/926,921.

Notice of Allowance dated Mar. 9, 2017 for related U.S. Appl. No. 14/278,429.

Notice of Allowance dated Mar. 27, 2017 for related U.S. Appl. No. 13/928,097.

Advisory Action dated May 25, 2017 for related U.S. Appl. No. 13/926,921.

Non-Final Office Action dated Dec. 14, 2017 for related U.S. Appl. No. 15/178,504.

Yu et al. "SNPdisk: An Efficient Para-Virtualization Snapshot Mechanism for Virtual Disks in Private Clouds", 2011 IEEE, pp. 20-26, Jul. 2011.

Extended European Search Report dated Oct. 16, 2017 for EP Application No. 15760880.3, 14 pages.

Xiao, et al., "Implementation and Performance Evaluation of Two Snapshot Methods on iSCSI Target Storages", *Proc. of NASA/IEEE Conference on Mass Storage Systems and Technologies*, (May 2006).

Martonosi, et al., "COS 318: Operating Systems Snapshot and NFS", *Computer Science Department, Princeton University*, (Oct. 26, 2011) retrieved from http://www.cs.princeton.edu/courses/archive/

(56) References Cited

OTHER PUBLICATIONS fall11/cos318/ (Publication date based on indicated capture date by Archive.org; first publication date unknown).

Agarwal, et al., "Snapshots in Hadoop Distributed File System", *UC Berkeley Technical Report UCB/EECS*, (Apr. 27, 2011) retrieved from https://pdfs.semanticscholar.org/2c1f/3946e68ba90ee5cda53152689e05fde7b376.pdf (Publication date based on indicated date by google.com; first publication date unknown).

CA Technologies, "CA ARCserve Backup for Windows Release Summary, Microsoft Volume Shadow Copy Service Guide rl5", (May 2010) retrieved from https://casupport.broadcom.com/cadocs/0/c013281e.pdf (Publication date based on indicated date by google.com; first publication date unknown).

IBM Corporation, "IBM XIV Provider for Microsoft Windows Volume Shadow Copy Service Version 2.4.0" (Jul. 2013).

Li et al., "iROW: An Efficient Live Snapshot System for Virtual Machine Disk", 2012 *IEEE 18th International Conference on Parallel and Distributed Systems*, (Dec. 17-19, 2012).

Chuang et al., "Generating Snapshot Backups in Cloud Virtual Disks". 2014 *IEEE 17th International Conference on Computational Science and Engineering*, (Dec. 19-21, 2014).

Notice of Allowance dated Dec. 10, 2018 for related U.S. Appl. No. 15/178,504.

European Office Action dated Mar. 26, 2019 for related EP Application No. 15760880.3.

Non-Final Office Action dated May 15, 2019 for related U.S. Appl. No. 15/178,504.

Non-Final Office Action dated May 23, 2019 for related U.S. Appl. No. 15/981,873.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Notice of Allowance dated Dec. 3, 2019 for related U.S. Appl. No. 15/178,504.

Kangarlou et al. "Taking Snapshots of Virtual Networked Environments", 2007 ACM, 3 pages, Nov. 2007.

Non-Final Office Action dated Dec. 12, 2019 for related U.S. Appl. No. 15/660,490.

Non-Final Office Action dated Mar. 26, 2020 for related U.S. Appl. No. 15/365,662.

Notice of Allowance dated Apr. 6, 2020 for related U.S. Appl. No. 15/660,490.

Final Office Action dated Oct. 31, 2019 for related U.S. Appl. No. 15/981,873.

Cano, I. et al., "Curator: Self-Managing Storage for Enterprise Clusters", 14th *USENIX Symposium on Networked Systems Design and Implementation, NSDI '17*, (Mar. 27, 2017).

Huang et al. "VMCSnap: Taking Snapshots of Virtual Machine Cluster with Memory Deduplication", IEEE, (Apr. 2014).

Notice of Allowance dated Jun. 25, 2020 for related U.S. Appl. No. 15/981,873.

Final Office Action dated Sep. 2, 2020 for related U.S. Appl. No. 15/365,662.

Advisory Action dated Nov. 17, 2020 for related U.S. Appl. No. 15/365,662.

Non-Final Office Action dated Mar. 4, 2021 for related U.S. Appl. No. 15/365,662.

Final Office Action dated Aug. 6, 2021 for related U.S. Appl. No. 15/365,662.

\* cited by examiner

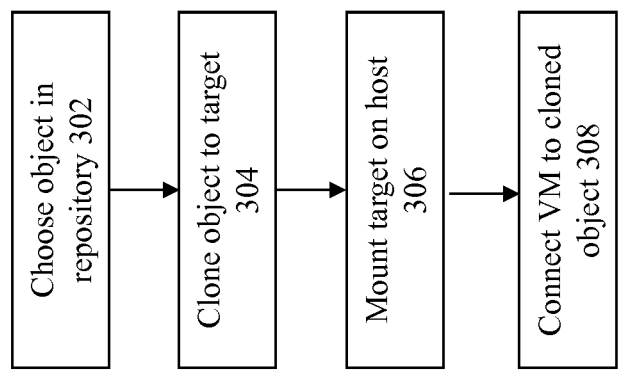

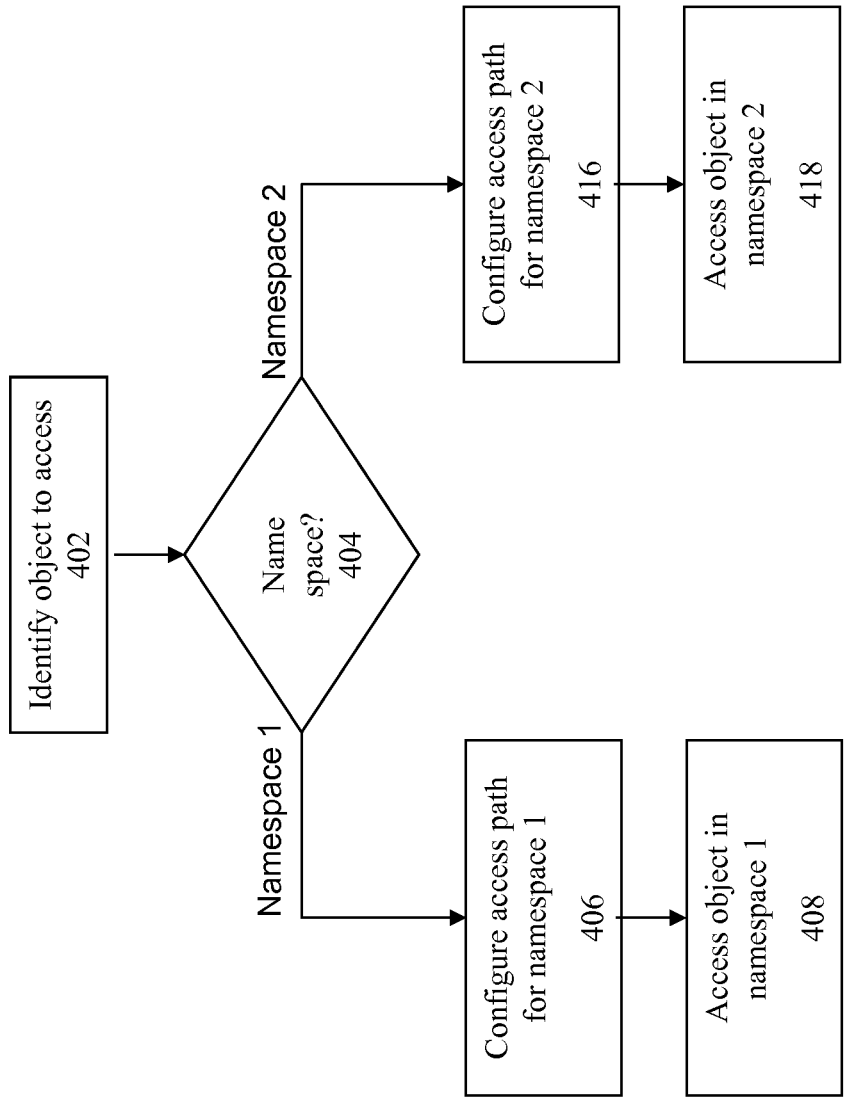

METHOD AND SYSTEM FOR IMPLEMENTING VIRTUAL MACHINE IMAGES

CROSS REFERENCE TO RELATED APPLICATIONS

The present application is related to U.S. Pat. No. 8,601,473, issued on Dec. 3, 2013, entitled "ARCHITECTURE FOR MANAGING I/O AND STORAGE FOR A VIRTUALIZATION ENVIRONMENT" and U.S. Pat. No. 9,009,106, issued on Apr. 14, 2015, entitled "METHOD AND SYSTEM FOR IMPLEMENTING WRITABLE SNAPSHOTS IN A VIRTUALIZED STORAGE ENVIRONMENT", and which are all hereby incorporated by reference in their entirety.

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Many types of objects may be employed to implement a virtualization system. An "image" is a special type of object that that includes components of a virtual machine that is intended to run in the virtualization environment. The image is often maintained as a file, which includes a copy of the operating system, desktop, applications, and/or other components for the execution environment for a running VM. The VM would essentially use the image to "boot up" within the virtualization system. For example, an Windows 7 image can be maintained that correspond to the Windows 7 operating environment, where the image also includes a set of designated applications to run in that Windows 7 operating environment. In operation, that image can be used to boot up a new VM to allow a user to run a virtual Windows 7 desktop in the virtualization system.

FIG. 1A illustrates one possible approach that can be taken to implement images for virtualization. In this approach, an image repository 104 is employed to hold image objects, such as object 108a. A host 110 may include a hypervisor 130 and a host storage device 106. Assume that there is a desire to a start a VM 102 at host 110 using image object 108a from the repository 104. This can be implemented by copying the image object 108a from repository 104 into the storage device 106 that is local to host 110. By creating a full copy 108b of the image object 108a at the host 110, this allows the host 110 to boot the VM 102 with a local copy 108b of the image object 108a that is locally accessible to the host 110.

However, there are numerous possible downsides associated with this approach. One source of inefficiency is that the entirety of the image needs to be copied from the image repository to the host. This can result in the consumption of an inordinate amount of storage space at the host, particularly if there are a large number of images that need to be copied and/or if the images have large file sizes. Furthermore, a significant amount of time and computing expense may need to be incurred to perform the copy operation that makes the local copy of the image at the local host.

Therefore, there is a need for a more efficient approach to implement virtualization objects, such as image files, that are stored in a remote repository.

SUMMARY

The present invention provides an improved approach to implement virtualization objects in a virtualization system. In some embodiments, the virtualization object from a first namespace is cloned as a snapshot that is accessible within a second namespace. To implement this, the virtualization object can be mounted as a target (implemented as a snapshot) that is locally accessible to the host.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIG. 3 shows a flowchart of an approach to implement some embodiments of the invention.

FIG. 4A illustrates where an original virtualization object from a first namespace is cloned as a snapshot that is separately accessible from within a second namespace.

FIG. 4B shows a flowchart of an approach where the file is separately accessible through the different namespaces.

DETAILED DESCRIPTION OF THE EMBODIMENTS OF THE INVENTION

The present invention provides an improved approach to implement virtualization objects in a virtualization system.
Overview As previously discussed, there are numerous downsides associated with the approach of making a full copy of remote virtualization objects at a local host. A requirement to make full copies can result in the consumption of a very large amount of storage space at the host, especially if there are a large number of images that need to be copied and/or if the images have large file sizes. In addition, a significant amount of time and computing expense may be needed to perform the copy operations to make the local copies.

Figure 1A:
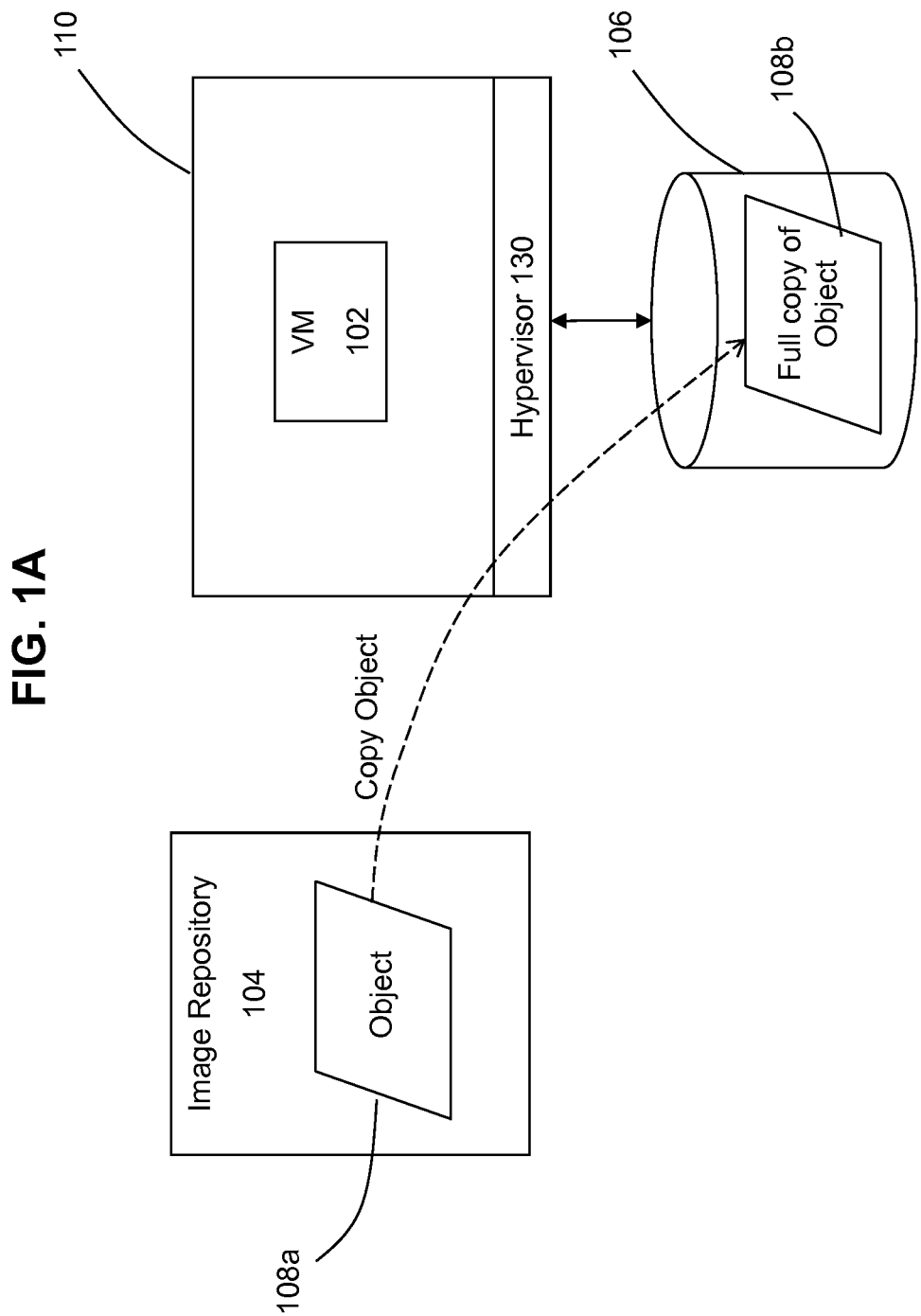
FIG. 1A illustrates one possible approach that can be taken to implement images for virtualization.
Figure 1B:
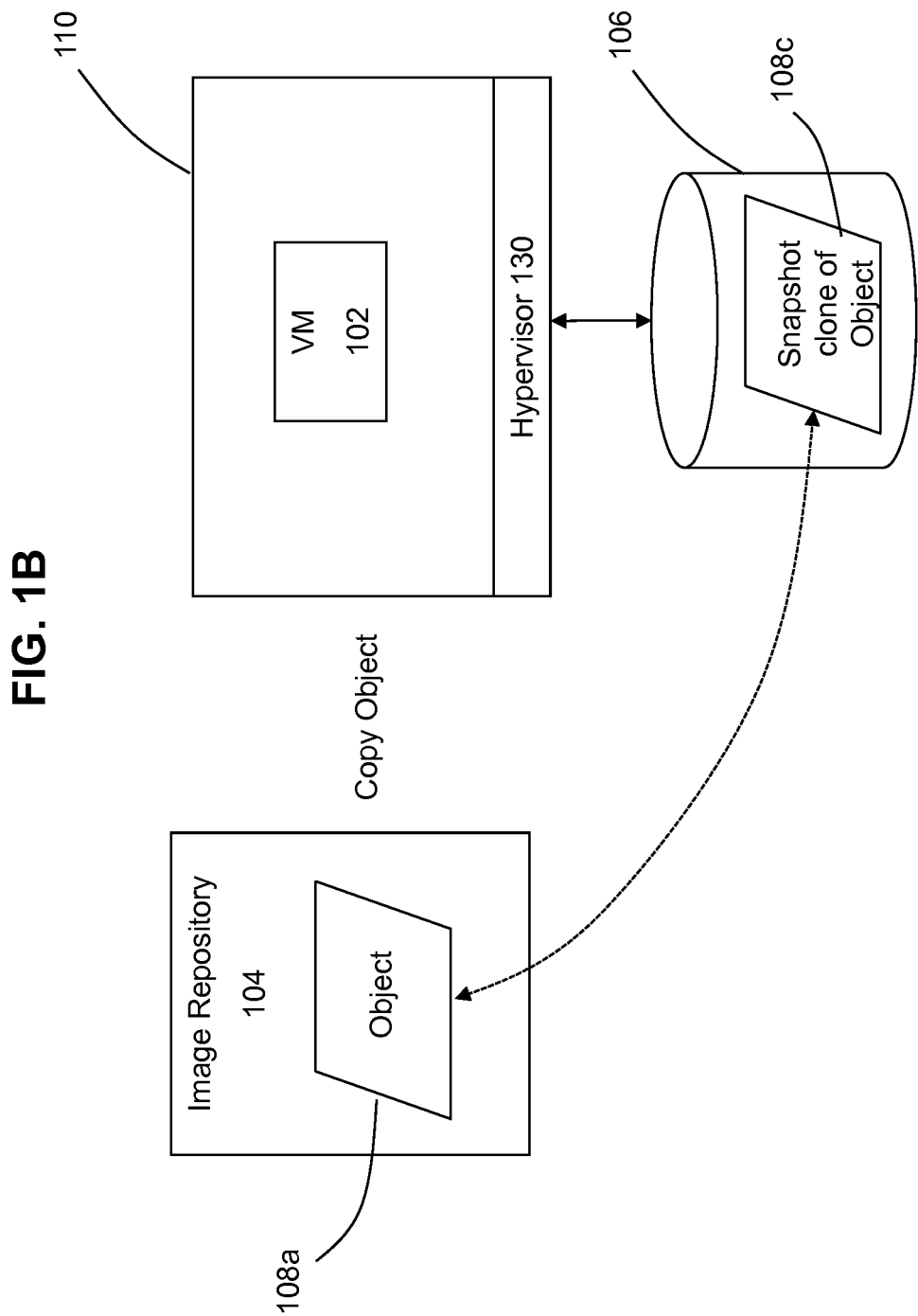
FIG. 1B illustrates an inventive approach to implement virtualization objects according to some embodiments of the invention.

FIG. 1B illustrates an inventive approach to address these problems according to some embodiments of the invention. As before, the original virtualization object 108a is stored in a remote repository 104. For example, in the context of virtualization images, the image repository can be implemented as a Glance repository where the virtualization images are stored as files within a NFS-based file structure. The Glance repository can be used in conjunction with the Openstack cloud-based architecture. Further details regarding Glance and Openstack can be found at the web address "www.openstack.org", the contents of which are hereby incorporated by reference in their entirety.

In the approach of FIG. 1B, the virtualization object 108a from the repository 104 is cloned as a "snapshot" that is accessible at the local host 110. In the computer science field, a snapshot is a term that is used to refer to the state of a set of data at a particular point in time. In some embodiments, the snapshot 108c is implemented as a "copy-on-write" snapshot, where the snapshot is represented (at least initially) as a set of metadata that is created to describe the contents of the snapshot, rather than requiring a full copy of the original object 108a.

This approach of cloning by using snapshots therefore avoids the need to make a full and immediate copy of the virtualization object at the host. This approach also permits the virtualization object located in a first namespace (e.g., the original virtualization object in the remote repository) to be referenced and accessed from within a second namespace (e.g., the snapshot at the local host).
Environment having Service/Controller VMs The inventive approach is particularly useful in a virtualization environment where a controller/service virtual machine or VM (hereinafter referred to herein as a "Service VM" or "Controller VM") is used to control and manage storage devices, including direct-attached storage in addition to network-attached and cloud-attached storage. The Service VM implements the storage controller logic in the user space, and with the help of other Service VMs in a cluster, virtualizes all storage hardware as one global resource pool. An example approach to implement service VMs and related virtualization architecture components is described in U.S. Pat. No. 8,601,473, issued on Dec. 3, 2013, which is hereby incorporated by reference in its entirety.

Figure 2A:
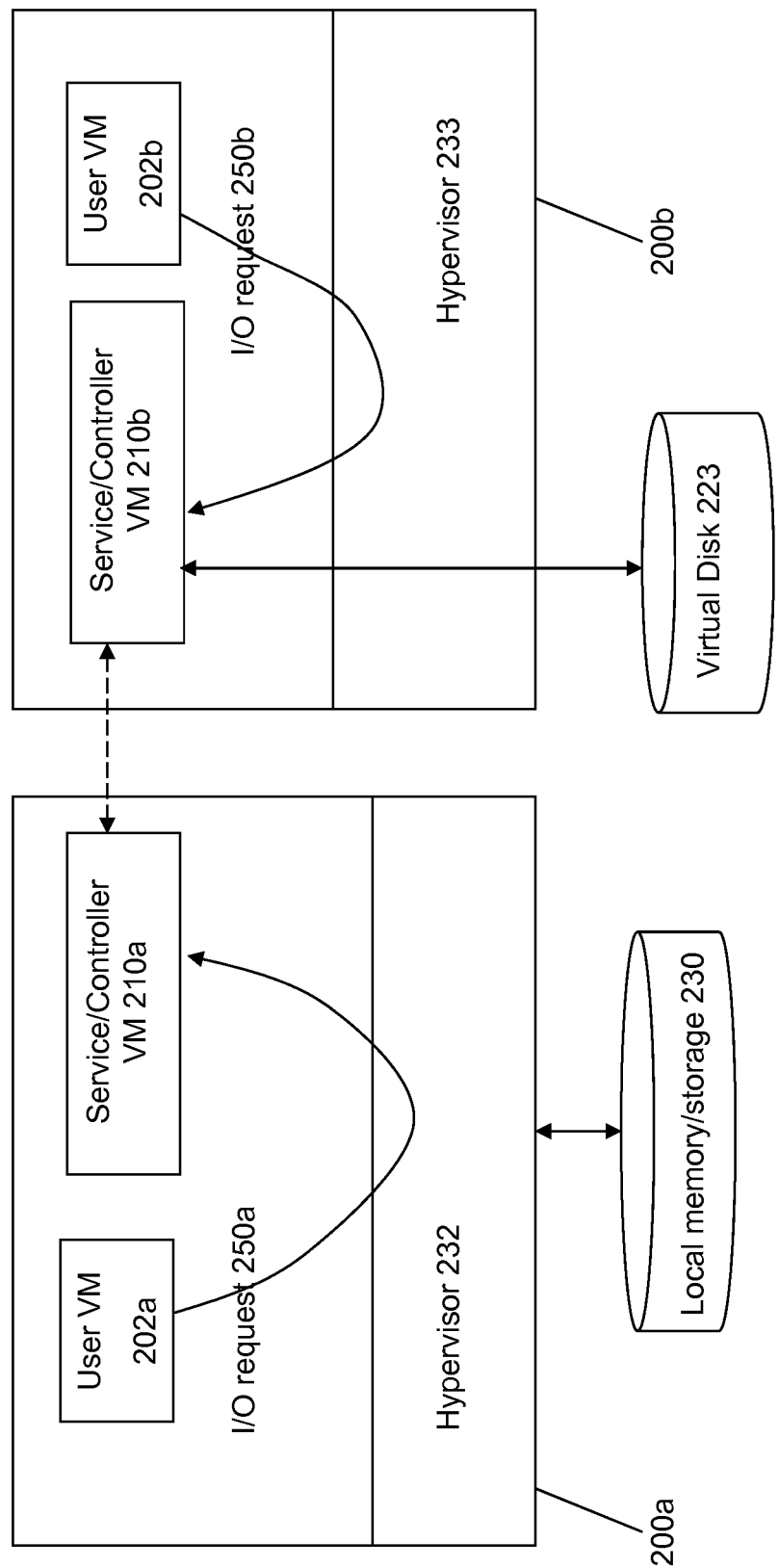
FIG. 2A illustrates an architecture for implementing storage management in a virtualization environment according to some embodiments of the invention.

FIG. 2A illustrates an architecture for implementing storage management in a virtualization environment according to some embodiments of the invention. This figure shows two nodes 200a and 200b. Each node 200a or 200b runs virtualization software, such as VMware ESX(i), Microsoft Hyper-V, or RedHat KVM. The virtualization software includes a hypervisor 232/233 to manage the interactions between the underlying hardware and the one or more user VMs 202a/202b.

The service VMs 210a/210b manage storage and I/O activities and functions as a storage controller. Multiple such storage controllers coordinate within a cluster to form a single-system. The service VMs 210a/210b are not formed as part of specific implementations of hypervisors 232/233. Instead, the Service VMs run as virtual machines above hypervisors 232/233 on the various server nodes 200a and 200b, and work together to form a distributed system that manages all the storage resources, including the locally attached storage, networked storage, and cloud storage. Since the Service VMs run above the hypervisors 232/233, this means that the approach can be used and implemented within any virtual machine architecture, since the Service VMs of embodiments of the invention can be used in conjunction with any hypervisor from any virtualization vendor.

Each Service VM exports one or more block devices or NFS server targets that appear as disks to the user VMs. These disks are virtual, since they are implemented by the software running inside the Service VMs. Thus, to the user VMs, the Service VMs appear to be exporting a clustered storage appliance that contains some disks. All user data (including the operating system) in the client VMs resides on these virtual disks.

This creates a distributed platform that contains multiple servers 200a and 200b that manages multiple-tiers of storage. The multiple tiers of storage include storage that is accessible through a network, such as cloud storage or networked storage (e.g., a SAN or "storage area network"). The architecture also permits local storage that is within or directly attached to the server and/or appliance to be managed as part of the storage pool. Examples of such storage include Solid State Drives (henceforth "SSDs") or Hard Disk Drives (henceforth "HDDs" or "spindle drives"). Virtual disks (or "vDisks") can be structured from the storage devices in the storage pool.

The shared virtual disk 223 can be accessed by multiple user VMs on different server nodes 200*a* and 200*b*. However, the virtual disk 223 is administratively "owned" by the service VM 210*b* on server node 200*b*. This means that service VM 210*b* is used to perform the actual read and write operations for its hosted storage objects, such as virtual disk 223. Therefore, all I/O requests for virtual disk 223 will be directed to service VM 210*b*, e.g., by using standard IP forwarding (Network Address Translation) rules in the networking stack of the service VMs.

For I/O requests 250*b* from a user VM 202*b* that resides on the same server node 200*b*, the process to handle the I/O requests 250*b* is straightforward. Essentially, the I/O request is in the form of an iSCSI or NFS request that is directed to a given IP address. The IP address for the I/O request is common for all the service VM on the different server nodes, but VLANs allows the IP address of the iSCSI or NFS request to be private to a particular (local) subnet, and hence the I/O request 250*b* will be sent to the local service VM 210*b* to handle the I/O request 250*b*. Since local service VM 210*b* recognizes that it is the owner of the virtual disk 223 which is the subject of the I/O request 250*b*, the local Service VM 210*b* will directly handle the I/O request 250*b*.

Figure 2B:
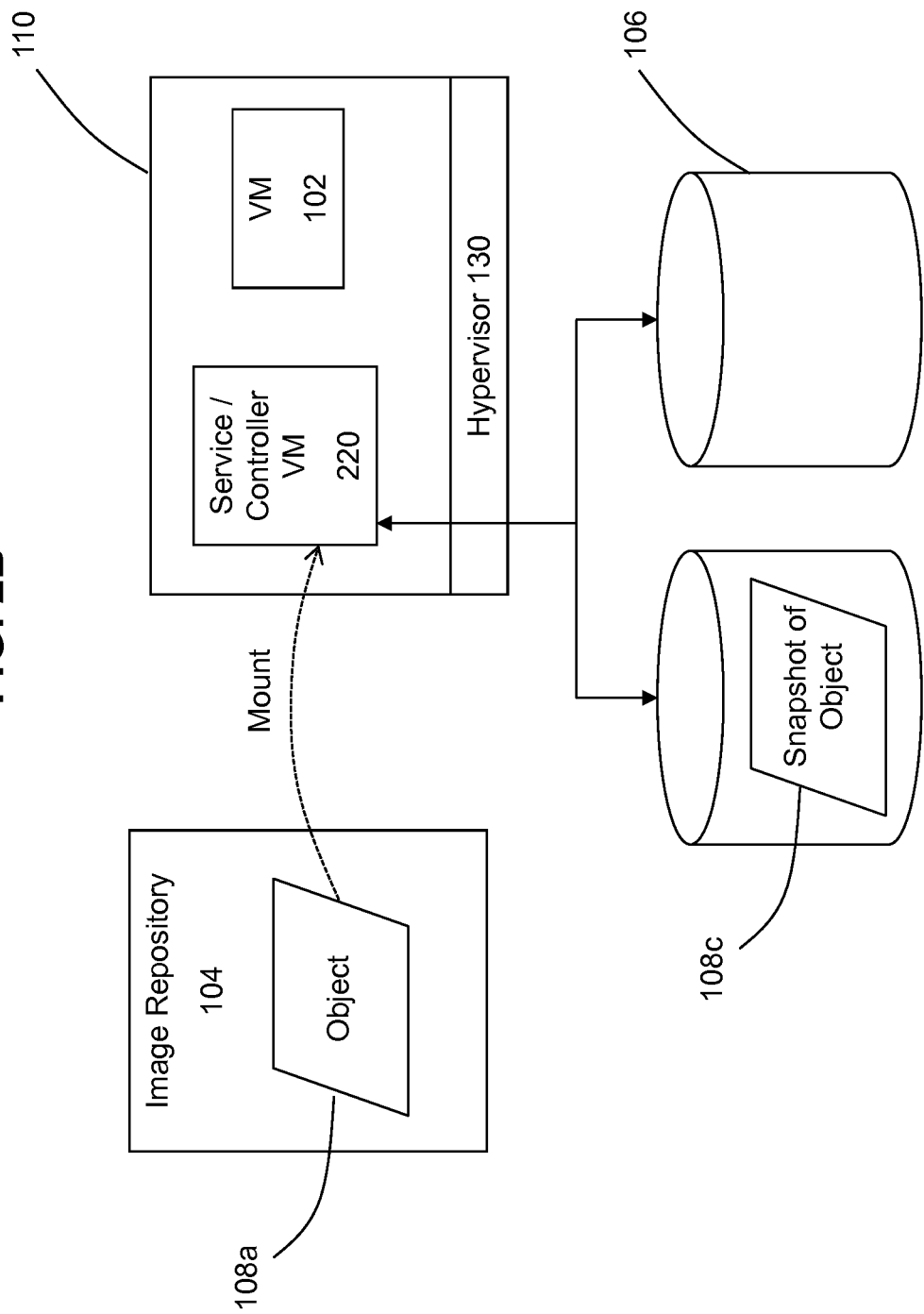
FIG. 2B illustrates an approach to implement some embodiments of the invention when used in an environment having service/controller VMs.

FIG. 2B illustrates an approach to implement some embodiments of the invention when used in an environment having service/controller VMs 220. As discussed above, the service VM 220 manages storage and I/O activities and functions as a storage controller for the VMs 102 within host 110.

The original virtualization object 108*a* is stored in a remote repository 104. In the context of virtualization images, the image repository can be implemented as a Glance repository where the virtualization images are stored as files within a NFS-based file structure.

However, the conventional Glance approach is particularly problematic in this architecture, since the service VIVI 220 is now responsible for functioning as the storage controller for the VMs 102 at host 110. The conventional Openstack/Glance system does not have any capability that can account for and handle virtualization images where a service VIVI 220 is employed to control the storage devices.

The present embodiment addresses these problems by mounting the virtualization object at the local host. In one embodiment (not shown in FIG. 2B), the service VM 220 can be implemented as a NFS server, and hence the image 108*a* (or its clone) is mountable to the service VM 220 as a mounted NFS object.

In the alternate approach shown in FIG. 2B, the virtualization image 108*a* is not directly mounted to the service VM 220. Instead, a clone 108*c* of the image is created and mounted as an iSCSI target that is managed by the service VM 220 like any other storage object (such as physical storage 106). The clone 108*c* can be created as a copy-on-write snapshot, where the snapshot is represented as a set of metadata corresponding to the underlying data, rather than the entirety of the data itself. The metadata provides information that allows the computing system to know about the existence of the snapshot and its relationship to the underlying data. Further details regarding one approach that can be taken to implement snapshots in a virtualization system is described in U.S. Pat. No. 9,009,106, issued on Apr. 14, 2015, which is hereby incorporated by reference in its entirety.

FIG. 3 shows a flowchart of an approach to implement some embodiments of the invention. At 302, the process identifies the object in the repository to be cloned. This action can be taken, for example, to select one or more NFS-based image files from an image repository for which there is a desire to start a corresponding VM at a virtualization host.

At 304, the virtualization object is cloned to the host. This action can be performed by creating a copy-on-write snapshot of the image object. A set of metadata is created to represent the new snapshot, where the snapshot's metadata corresponds to the underlying data.

Next, at 306, the clone is mounted to the host. For example, if the selected image object is a NFS-based image file from an image repository, then the clone can be created as a copy-on-write snapshot embodied as an iSCSI target. The new iSCSI target is then mounted on the host.

Thereafter, at 308, the VM is connected to the cloned virtualization object. This can be performed, for example, to allow the VM to start up using the cloned image file. The cloned image is accessible by having the VM access the iSCSI target via iSCSI calls to the target.

Namespace Management

As illustrated in FIG. 4A, the original virtualization object 402 from a first namespace (Namespace 1) is cloned as a snapshot 404 that is separately accessible from within a second namespace (Namespace 2). To implement this, as discussed above, the virtualization object can be mounted as a target (implemented as a snapshot) that is locally accessible to the host.

FIG. 4B shows a flowchart of an approach where the file is separately accessible through the different namespaces. In this approach, the original object and its newly created clone are not within the same namespace. Instead, each is located within distinguishably different namespaces.

At 402, identification is made of the object to be accessed. The selected object can be, for example, an image file within a virtualization system.

A determination is made at 404 of the specific namespace associated with the object to be accessed. In the current example, the object may be associated with a first namespace for the Glance repository having the original image object. Alternatively, the object of interest may be associated with a second namespace for the host system having the clone of the image. While this example identifies only two alternative namespaces, one of ordinary skill in the art would readily recognize that the operative principles described herein are applicable to any number of different namespaces.

If the object is associated with the first namespace, then at 406, the access specifics/parameters for the object are configured for access to the first namespace. This can be performed, for example, by configuring and associating the appropriate access path for the first namespace to the object. Thereafter, at 408, that access path is used to access the object within the first namespace.

If the object is associated with the second namespace, then at 416, the access specifics/parameters for the object are configured for access to the second namespace. This can be performed by configuring and associating the appropriate access path for the second namespace to the object. Thereafter, at 418, that access path is used to access the object within the second namespace.

Figure 5A:
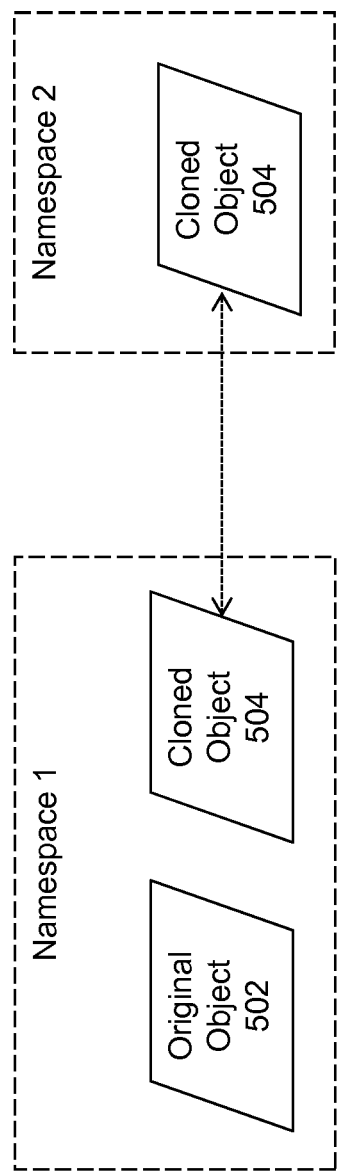
FIG. 5A illustrates where an original virtualization object and its clone are accessible from within a common namespace.

In an alternate embodiment, both the original object and its clone are accessible from within the same namespace. As illustrated in FIG. 5A, the original virtualization object 502 from a first namespace (Namespace 1) is cloned as a snapshot 504 in a second namespace (Namespace 2). However, in this approach, both the original object 502 and the clone 504 are accessible from within a first namespace.

Figure 5B:
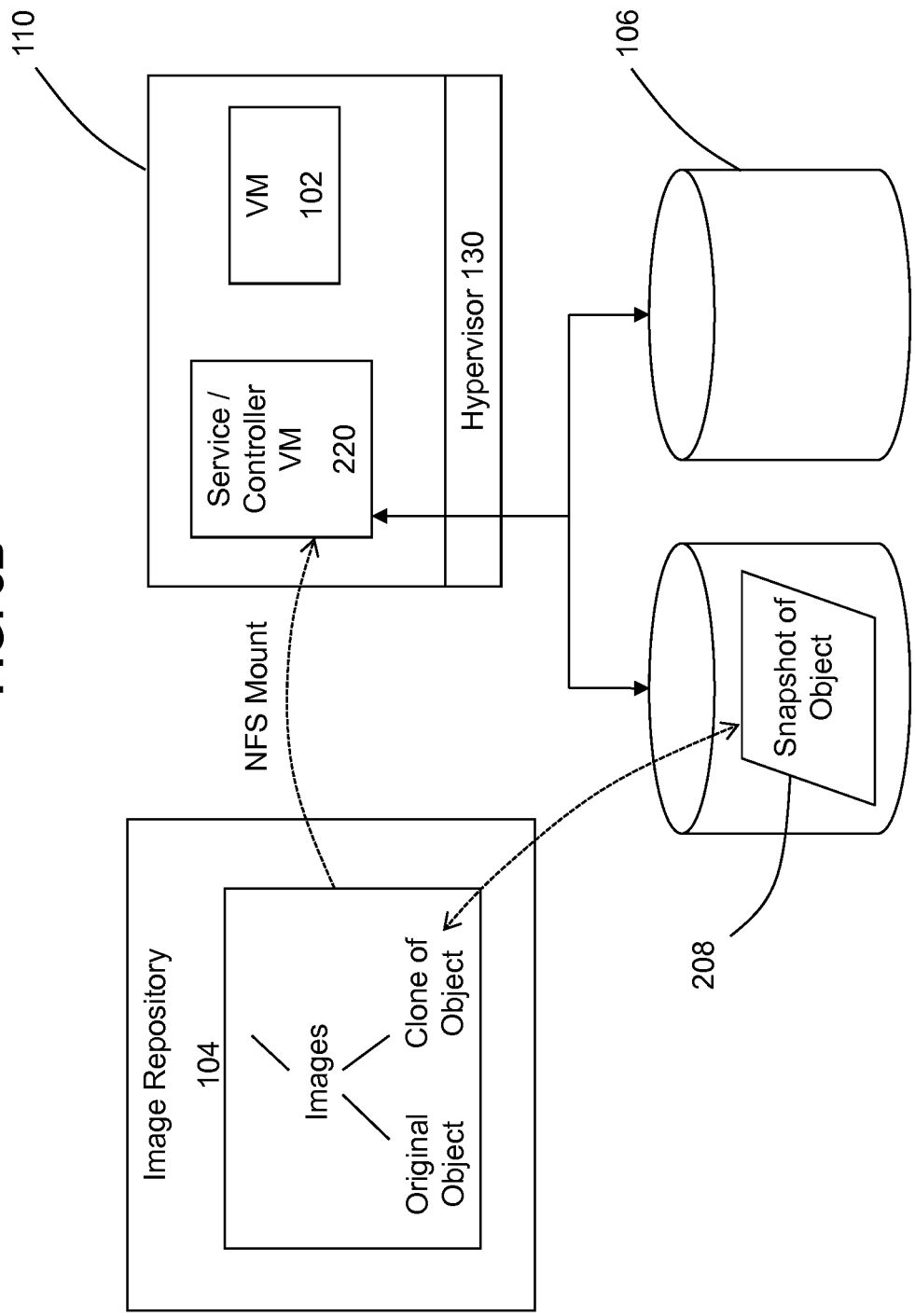
FIG. 5B illustrates an architecture to implement the approach of FIG. 5A.

This approach can be visualized as shown in the architecture of FIG. 5B. The original virtualization object 502 is created in the context of a first namespace associated with the image repository 104. A clone of the original object was created as a snapshot 208 in the context of a second namespace associated with host 110.

This embodiment of the invention allows access to both the original object and the clone from within the same namespace, e.g., the namespace associated with the image repository 104. In some embodiments, this is implemented by mounting the clone as an object within the object hierarchy of the first namespace. For example, in the context of virtualization images, the image repository can be implemented as a Glance repository where the virtualization images are stored as files within a NFS-based file structure. For this type of system, the clone would be mounted as another file within the NFS file structure of the repository. This type of mounting can also be implemented in the other direction as well, where the original object is mounted within the object hierarchy of the host.

Figure 5C:
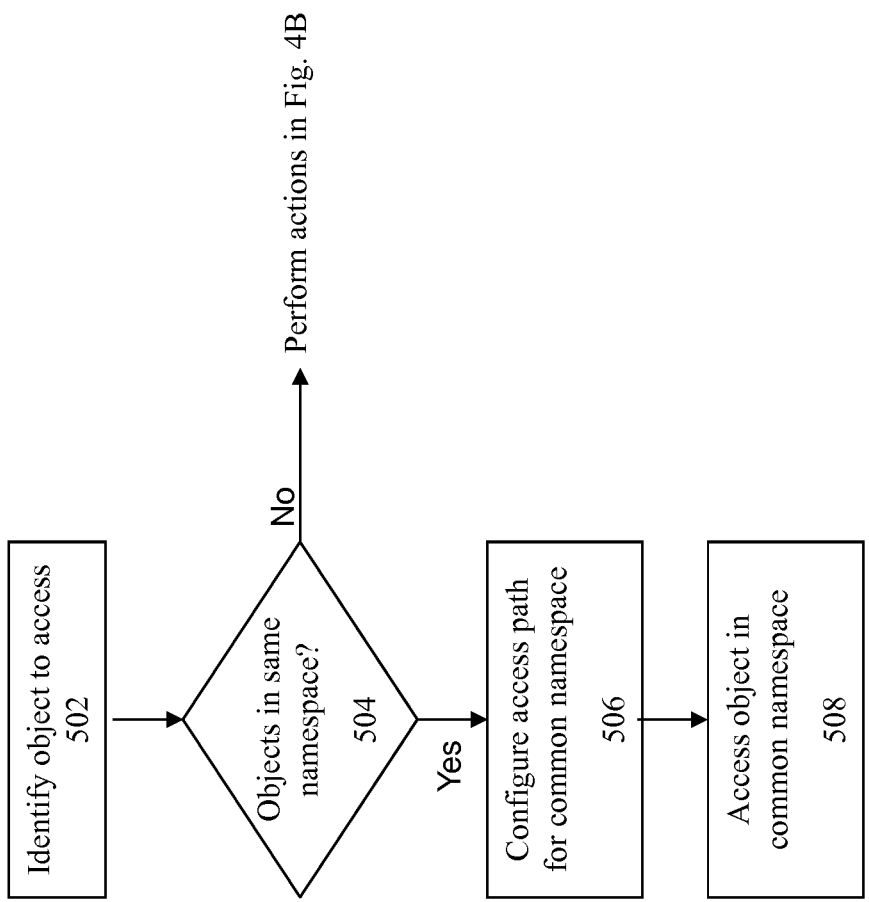
FIG. 5C shows a flowchart of an approach to access objects where the same namespace is usable to access both the original and clone of an object.

FIG. 5C shows a flowchart of an approach to access objects where the same namespace is usable to access both the original and clone of an object. At 502, identification is made of the object to be accessed. The selected object can be, for example, either the original or the clone of an image file within a virtualization system.

A determination is made at 504 whether a common namespace is usable to access the objects. If not, then the process described with respect to FIG. 4B is employed to access the object(s) using the appropriate namespace.

If, however, the object of interest is associated with the common namespace, then at 506, the access specifics/parameters for the object are configured for access to the common namespace. This can be performed, for example, by configuring and associating the appropriate access path for the common namespace to the object.

Thereafter, at 508, that access path is used to access the object within the common namespace. For example, in the context of virtualization images, the image repository can be implemented as a Glance repository where the image files are mounted as files within a NFS-based file structure. For this type of system, the original image file could exist as an actual file within the NFS file structure. However, the clone would be mounted as a file within the NFS file structure. As shown in FIG. 5B, the clone can be placed within a subdirectory of the file structure having a common parent node as the original image file. Either of the image files would thus be addressable within the context of the namespace associated with the image repository by providing the appropriate NFS path within the repository for the image file of interest.

Figure 6:
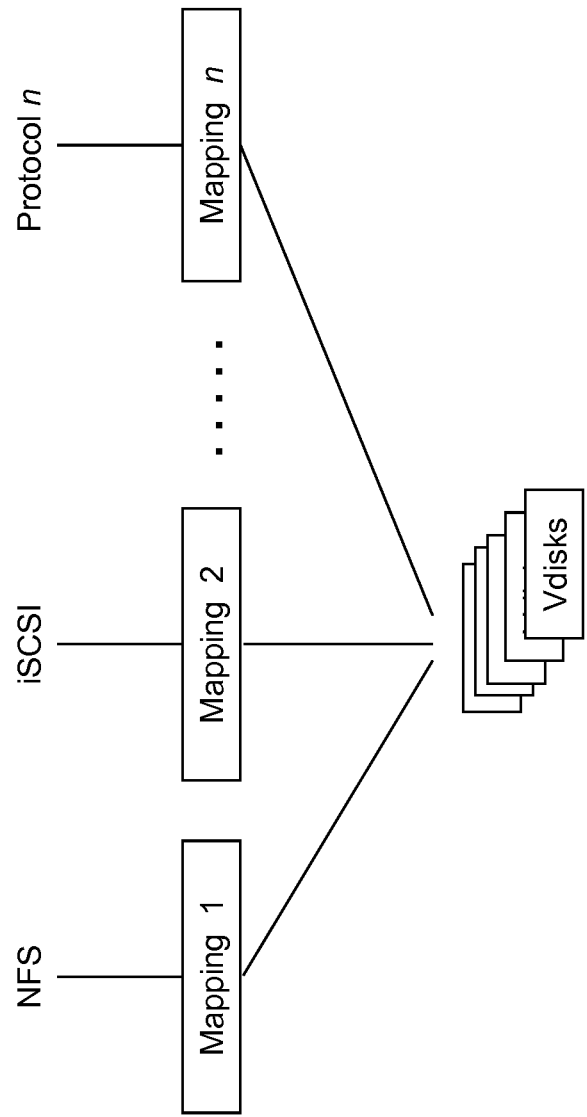
FIG. 6 provides an illustration of one possible approach to perform namespace management for data within a virtualization system.

FIG. 6 provides an illustration of one possible approach to perform namespace management for data within a virtualization system. In this system, the underlying data is represented as a set of one or more "vdisks" or "virtual disks". These are data constructs to hold data that are abstracted from the underlying storage hardware to hold that data. Each vdisk is addressable using an identifier that is unique to that vdisk. In effect, the vidsk identifier (vdisk ID) forms the namespace for the set of vdisks.

To manage namespaces for virtualization objenctions, the vdisks and their underlying vdisk IDs are exposed to other namespaces. This is accomplished by mapping the other namespaces to the vdisks/vdisk IDs.

A mapping may be created for each of the possible access namespaces that are usable to access objects implemented as vdisks. For example, a first mapping (Mapping 1) can be used to map an NFS namespace to the vidusks/vdisk IDs. Similarly, a second mapping (Mapping 2) can be used to map an iSCSI namespace to the vidusks/vdisk IDs. Any number of mappings can be employed as needed to handle different namespaces for which the vdisks need to be exposed.

Clone Implemented as a Writable Snapshot

Embodiments of the present invention provide an approach for implementing the cloned objects as writable snapshots. As noted above, the embodiments of the present invention provides a very efficient approach for implementing clones as snapshots that can be used to immediately without incurring delays in providing access to the new snapshots. For data that is not copied from the parent snapshot to a child snapshot, data requests for such data are redirected to the contents of the parent snapshot.

In many cases, the visualization objects may need to be modified by a user during the user's operation of the VM. For example, consider the situation in which a disk image includes an operating system. As the user makes use of the operating system, it is likely that changes and modifications will occur to various files pertaining to the operating systems, such as to files that maintain the system registry.

To address this issue, the clone of the virtualization object can be implemented as a "writable" snapshot. A writable snapshot is a type of snapshot that permits modifications to the snapshot. In the present embodiment, the user is provided the writable snapshot in such a way that the user can later perform modifications to that snapshot. Once a modification is made to the snapshot, then a new variant of the snapshot is created which differs from the original snapshot. However, it is likely that both the original snapshot and the new variants of the snapshot will need to be maintained in the overall computing system. As more changes are introduced by different entities in the computing system, there will be an extending proliferation of such snapshot variants into the system.

Figure 7:
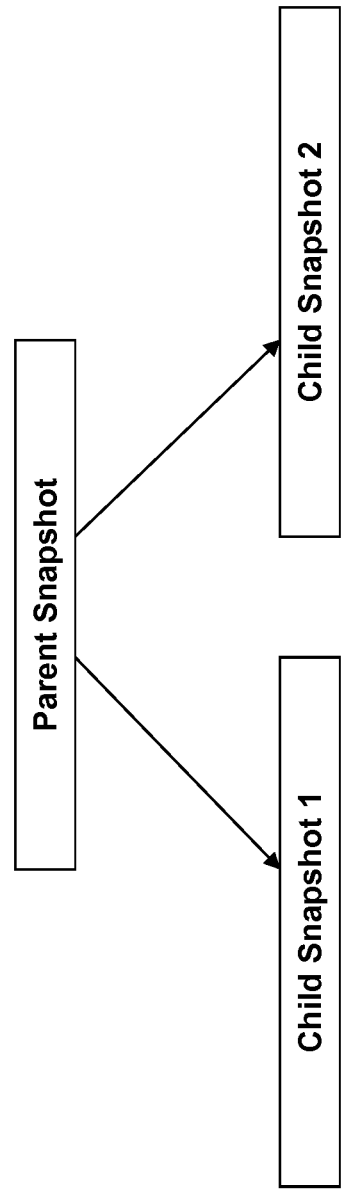
FIG. 7 illustrates the cloned object implemented as a writable snapshot.

According to some embodiments, writable snapshots are implemented by forking a parent snapshot into multiple children snapshots. This approach is conceptually illustrated in FIG. 7 which shows a parent snapshot that has been forked into two child snapshots 1 and 2. In this approach, both children snapshots 1 and 2 start off as exact copies of the parent snapshot. However, one snapshot (e.g., child 2) is designated as the "new" writable snapshot and the other (e.g., child 1) is designated as a copy of the parent snapshot that will now take the place of the parent snapshot. After the children snapshots 1 and 2 are created, future requests are no longer sent for processing to the parent snapshot. Instead, future requests for the writable snapshot are sent to the child snapshot 2 and all requests for the original snapshot are sent to the child snapshot 1.

To increase the performance of this forking process, the contents of the parent snapshot are not immediately copied to the child snapshots. Instead, the new child snapshots can be created without any perceptible delay by the user. This action may be performed by only immediately creating/copying selected metadata associated with the new child snapshots, where the full contents of the parent snapshot are not immediately copied to the child snapshots. The metadata is the information that allows the computing system to know about the existence of the new snapshots. The metadata also provides information regarding the parent snapshot, so that any data requests for data within the child snapshot can be redirected to the parent snapshot if the requested data had not yet been copied or created into the child snapshot. For example, configuration metadata (e.g., for a virtual disk) can be quickly and immediately created for the child snapshot (as opposed to, for example, mapping metadata for the blocks of the virtual disk which may not need to be created/copied immediately). Some or all of the content of the parent snapshot is not copied right away into the child snapshot, unless it is immediately needed, e.g., in order to modify that data in the child snapshot. For data within the child snapshots that have not changed, requests are actually referred to the parent snapshot. It is this aspect of embodiments of the invention that allows the writable snapshots to be immediately created, without requiring the user to undergo any perceptible wait time. The present approach takes advantage of the common content between the parent and child snapshots to effectively create child snapshots without any significant negative effects on the overall system performance, since all of the data from the parent snapshot does not need to be immediately copied to the child snapshot before users can start accessing the child snapshots.

The data content explicitly stored within in the child snapshots can be populated at a later point in time. There are several possible approaches that can be taken to populate the child snapshots with actual data. One possible approach is to perform a "lazy" copy process in which the contents of the parent snapshot are copied to the child snapshots over time. For example, the system could be configured to wait until light period of system resource usage or activity, e.g. in the middle of the night (when there are less number of users using the system), to perform the copying of data from the parent snapshot to the child snapshots.

Another possible approach is to wait until there is a request to "write" or "modify" an item of data in the child snapshot. In this situation, the request will cause the data within the child snapshot to change. Depending upon the type of operation being performed to the data in the child snapshot, there may or may not be the need to perform copying from the parent snapshot to a child snapshot. For example, the requested operation may be directed to an operation that will completely or significantly overwrite the contents of a block in the child snapshot. In this situation, it does not make sense to copy the data from the parent snapshot since the data will be overwritten anyway.

On the other hand, the requested operation may only overwrite a small portion of the data in the block. In this situation, it may make sense to copy the block data from the parent snapshot to the child snapshot, and after copying the data, to modify only the portion that is to be modified by the user request. Alternatively, this situation can be handled by partitioning the block such that the unchanged portions will still be referenced to the parent snapshot, but the changed portions of the block will exist as actual data within the child snapshot.

A combination of these approaches can be taken to populate the data content within the child snapshots. Alternatively or in combination with these approaches, the system can be configured to maintain data references for data requests from the child snapshots to the parent snapshot.

In any case, it is possible for some portion of the child snapshot to contain actual data while other portions remain in a state in which data requests are referenced to the parent snapshot.

As noted above, metadata associated with the new snapshots are created at the time of creation for the child snapshots. The metadata is the information that allows the computing system to know about the existence of the new snapshots. The metadata also provides information regarding the parent snapshot, so that any data requests for data within the child snapshot can be redirected to the parent snapshot if the requested data had not yet been copied or created into the child snapshot.

Further details regarding an exemplary approach to implement writable snapshots is described in U.S. Pat. No. 9,009,106, issued on Apr. 14, 2015, which is hereby incorporated by reference in its entirety.

Conversions

Some embodiments of the present invention provide an approach for performing conversions to the image data. This permits image data that originate for a first platform to be converted to another platform. For example, some embodiments support the conversion of VMDK (virtual disk for the VMWare virtualization product) to VHDX (virtual disk for the Microsoft HyperV product), and vice versa.

To accomplish this, the process starts by taking a copy of the image data. In one embodiment, a writable snapshot is obtained that corresponds to the data to be converted.

Next, metadata is stored to facilitate the conversion process. The metadata pertains to format and header changes that are needed for the conversions. These metadata changes include, for example, changes relating to writing of new headers to data layers.

The conversions are implemented according to the metadata set in the previous step, and the new file is presented (with new extensions and format) in the same or in a different namespace. At this point, the converted file is now accessible, in the appropriate namespace, to be used to start up a new VM.

Any conversion types can be addressed using this technique. As a non-limiting list of example, this approach can be taken to perform conversions for the SMB format to the iSCSI format, SMB format to NFS format, iSCSI format to SMB format, NFS format to SMB format, and iSCSi format to NFS conversion types.

System Architecture

Figure 8:
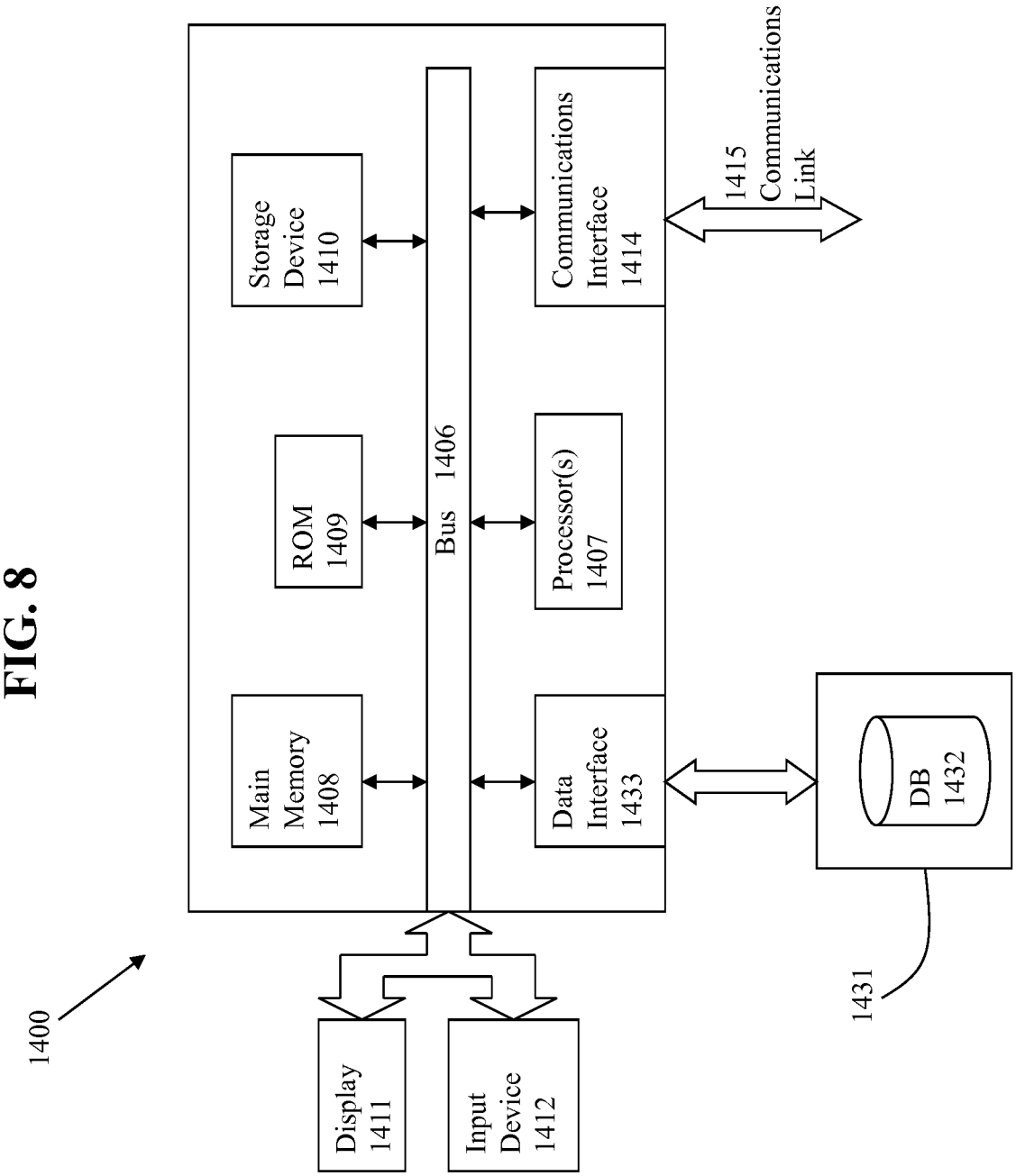
FIG. 8 is a block diagram of a computing system suitable for implementing an embodiment of the present invention.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:
   identifying an image file of a virtual machine, the image file corresponding to a first file system in a first namespace;
   copying, from the image file, a subportion of the image file corresponding to the virtual machine to a host machine, the subportion being smaller than an entirety of the image file;
   starting up the virtual machine on the host machine at a second file system in a second namespace using the subportion that has been copied to the host machine;
   after the virtual machine has been started up on the host machine, granting access to the subportion on the host machine at least by servicing a user write request to the subportion in the second namespace;
   copying a remainder of the image file to the host machine after the virtual machine has been started up; and
   wherein the subportion of the image file is based at least in part upon creating or copying metadata for a child snapshot to the host machine without copying full contents of a parent snapshot to the host machine.

2. The method of claim 1, further comprising cloning a virtualization object in a repository in which the image file is stored by performing a copy-on-write operation that copies metadata indicating a state of the virtualization object into the image file in the repository.

3. The method of claim 1, wherein the image file is converted from a first image format to a second image format when copying the image file or the subportion of the image file to a target.

4. The method of claim 1, further comprising cloning a first virtual machine in the first namespace as the image file to a storage pool.

5. The method of claim 1, further comprising accessing, via a controller virtual machine executing above a hypervisor in the host machine, the subportion of the image file and the remainder of the image file.

6. The method of claim 5, wherein the subportion of the image file comprises first metadata associated with the subportion and second metadata associated with the image file, and the method further comprises redirecting a data request for data within the remainder to the image file or an instance thereof prior to copying the remainder of the image file to the host machine.

7. The method of claim 1, wherein the subportion that is copied to the host machine corresponds to a data block in the image file that is modified at the host machine.

8. The method of claim 1, further comprising:
   mounting the subportion of the image file as a mounted object in the second namespace that is managed by a controller virtual machine, wherein the controller virtual machine executes above a hypervisor on the host machine.

9. The method of claim 1, wherein the image file is transferred between a first location and a second location, and at least one of the first or second locations comprises a cloud-based architecture.

10. The method of claim 1, wherein an access parameter comprising an access path is configured to access an object in at least one of the first or second namespaces.

11. The method of claim 1, wherein a namespace is mapped to a virtual disk to manage the first or second namespaces.

12. A computer program product embodied on a non-transitory computer readable medium, having stored thereon a sequence of instructions which, when executed by a processor, causes the processor to execute a set of acts, the set of acts comprising:
   identifying an image file of a virtual machine, the image file corresponding to a first file system in a first namespace;
   copying, from the image file, a subportion of the image file corresponding to the virtual machine to a host machine, the subportion being smaller than an entirety of the image file;
   starting up the virtual machine on the host machine at a second file system in a second namespace using the subportion that has been copied to the host machine;
   after the virtual machine has been started up on the host machine, granting access to the subportion on the host machine at least by servicing a user write request to the subportion in the second namespace;
   copying a remainder of the image file to the host machine after the virtual machine has been started up; and
   wherein the subportion of the image file is based at least in part upon creating or copying metadata for a child snapshot to the host machine without copying full contents of a parent snapshot to the host machine.

13. The computer program product of claim 12, wherein the set of acts further comprises cloning a virtualization object in a repository in which the image file is stored by performing a copy-on-write operation that copies metadata indicating a state of the virtualization object into the image file in the repository.

14. The computer program product of claim 12, wherein the image file is converted from a first image format to a second image format when copying the image file or the subportion of the image file to a target.

15. The computer program product of claim 12, wherein the set of acts further comprises cloning a first virtual machine in the first namespace as the image file to a storage pool.

16. The computer program product of claim 12, wherein the set of acts further comprises accessing, via a controller virtual machine executing above a hypervisor in the host machine, the subportion of the image file and the remainder of the image file.

17. The computer program product of claim 16, wherein the subportion of the image file comprises first metadata associated with the subportion and second metadata associated with the image file, and the set of acts further comprises redirecting a data request for data within the remainder to the image file or an instance thereof prior to copying the remainder of the image file to the host machine.

18. The computer program product of claim 12, wherein the subportion that is copied to the host machine corresponds to a data block in the image file that is modified at the host machine.

19. The computer program product of claim 12, wherein the set of acts further comprises:
mounting the subportion of the image file as a mounted object in the second namespace that is managed by a controller virtual machine, wherein the controller virtual machine executes above a hypervisor on the host machine.

20. A virtualization system, comprising:
a microprocessor of a host machine;
memory storing thereupon a sequence of instructions which, when executed by the microprocessor, causes the microprocessor at least to:
identify an image file of a virtual machine, the image file corresponding to a first file system in a first namespace;
copy, from the image file, a subportion of the image file corresponding to the virtual machine to a host machine, the subportion being smaller than an entirety of the image file;
start up the virtual machine on the host machine at a second file system in a second namespace using the subportion that has been copied to the host machine;
after the virtual machine has been started up on the host machine, grant access to the subportion on the host machine at least by servicing a user write request to the subportion in the second namespace;
copy a remainder of the image file to the host machine after the virtual machine has been started up; and
wherein the subportion of the image file is based at least in part upon creating or copying metadata for a child snapshot to the host machine without copying full contents of a parent snapshot to the host machine.

21. The virtualization system of claim 20, in which the sequence of instructions, when executed by the microprocessor, further causes the microprocessor to clone a virtualization object in a repository in which the image file is stored by performing a copy-on-write operation that copies metadata indicating a state of the virtualization object into the image file in the repository.

22. The virtualization system of claim 20, wherein the image file is converted from a first image format to a second image format when copying the image file or the subportion of the image file to a target.

23. The virtualization system of claim 20, wherein the sequence of instructions, when executed by the microprocessor, further causes the microprocessor to clone a first virtual machine in the first namespace as the image file to a storage pool.

24. The virtualization system of claim 20, wherein the sequence of instructions, when executed by the microprocessor, further causes the microprocessor to access, via a controller virtual machine executing above a hypervisor in the host machine, the subportion of the image file and the remainder of the image file.

25. The virtualization system of claim 24, wherein the subportion of the image file comprises first metadata associated with the subportion and second metadata associated with the image file, and the sequence of instructions, when executed by the microprocessor, further causes the microprocessor to redirect a data request for data within the remainder to the image file or an instance thereof prior to copying the remainder of the image file to the host machine.

26. The virtualization system of claim 20, wherein the subportion that is copied to the host machine corresponds to a data block in the image file that is modified at the host machine.

27. The virtualization system of claim 20, wherein the sequence of instructions which, when executed by the microprocessor, further causes the microprocessor to:
mount the subportion of the image file as a mounted object in the second namespace that is managed by a controller virtual machine, wherein the controller virtual machine executes above a hypervisor on the host machine.

* * * * *